(12) United States Patent
Amichai

(10) Patent No.: US 9,465,718 B2
(45) Date of Patent: Oct. 11, 2016

(54) FILTER GENERATION FOR LOAD TESTING MANAGED ENVIRONMENTS

(75) Inventor: Nitsan Amichai, Yahud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 1741 days.

(21) Appl. No.: 12/261,761

(22) Filed: Oct. 30, 2008

(65) Prior Publication Data

US 2010/0115496 A1 May 6, 2010

(51) Int. Cl.
*G06F 9/44* (2006.01)
*G06F 13/10* (2006.01)
*G06F 13/12* (2006.01)
*G06F 11/36* (2006.01)

(52) U.S. Cl.
CPC ....... *G06F 11/3612* (2013.01); *G06F 11/3688* (2013.01)

(58) Field of Classification Search
USPC .......................................................... 703/21
See application file for complete search history.

(56) References Cited

U.S. PATENT DOCUMENTS

| 6,011,918 A * | 1/2000 | Cohen ...................... G06F 8/30 709/201 |
| 6,477,585 B1 * | 11/2002 | Cohen ..................... G06F 9/542 719/318 |
| 6,721,686 B2 * | 4/2004 | Malmskog .......... H04L 12/2697 702/122 |
| 2002/0019886 A1 * | 2/2002 | Sanghvi .................. G06F 9/542 719/318 |

* cited by examiner

*Primary Examiner* — Saif Alhija
(74) *Attorney, Agent, or Firm* — Dicke, Billig & Czaja, PLLC

(57) ABSTRACT

Automatic filter generation is used in a script for load testing a client application in a client/server managed environment. Filters are generated by recording managed libraries used in the client application and recording a flow of executable instructions of the client application. The recorded data is analyzed to identify classes that generate client/server communication. The filters are created with the identified classes that generate client/server communication.

20 Claims, 2 Drawing Sheets

FILTER GENERATION FOR LOAD TESTING MANAGED ENVIRONMENTS

BACKGROUND

Load testing generally refers to the practice of modeling an expected usage of a software system by simulating multiple users concurrently accessing services of the system prior to deploying the software program to its intended users. Load testing is often relevant for multiple-user systems that are based on using a client/server model such as web servers. Other types of software systems, however, can be load-tested. In one example, a word processor or graphics editor program can be forced to read an extremely large document during a test, and another example is a financial program forced to generate a report from several years of data.

The term load testing is often used synonymously with performance testing, reliability testing, performance validation, volume testing, and so on. One form of load testing can include stress testing, which occurs when a load placed on a system is raised beyond normal usage patterns in order to test the response of the system at unusually high loads. Load testing can be used to determine response times, the number of visitors and users a web site can handle, response times, what can be done to allow the web site to handle more visitors and user, what can be done to increase response times, and so on.

Load testing can occur with actual or theoretical, loads. Although actual loads provide more accurate results than theoretical loads, employing hundreds or thousands of actual users to test a system is too often impractical. In these cases, load testing includes a load testing program that generates virtual users to stress the system. One example can include load testing a bookstore web server prior to making available what is expected to be a very popular book. One or more tests can be created with a load testing program to simulate multiple virtual users accessing the website in one or more different ways. The effect of these tests on the system are recorded and analyzed to determine if the web server is ready for the launch of the book or whether changes need to be made to web server.

This example is representative of a common and relatively straight-forward load test. The client server/model in this example involves an architecture based on a thin client, such as a program running through a web browser, communicating with a web server.

Difficulties exist, however, in designing and running load test for a smart client communicating with a server using a managed environment. The common load test where the client/server communication is recorded and analyzed does not work for this system because the communications are typically binary or encrypted.

In order to overcome this difficulty, load test engineers record on the client side application program interface and manually generate a script using the client side programming classes and methods. Unfortunately, this approach is also problematic. For example, the load test engineer must have a detailed knowledge of the client side architecture, class diagrams, and other technical aspects of the client. Also, the process of generating a script is time consuming, iterative, and error prone. Also, this often takes days of work to complete. Even once completed, the script is often inefficient and is unintentionally designed to test either too much or too little, which results in inaccurate or unreliable test data. Currently, managed environments are considered the most challenging and difficult projects in load testing.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. It is to be understood that the features of the various exemplary embodiments described herein may be combined with each other, unless specifically noted otherwise. The following detailed description, therefore, is not to be taken in a limiting sense, and the scope of the present invention is defined by the appended claims.

Figure 1:
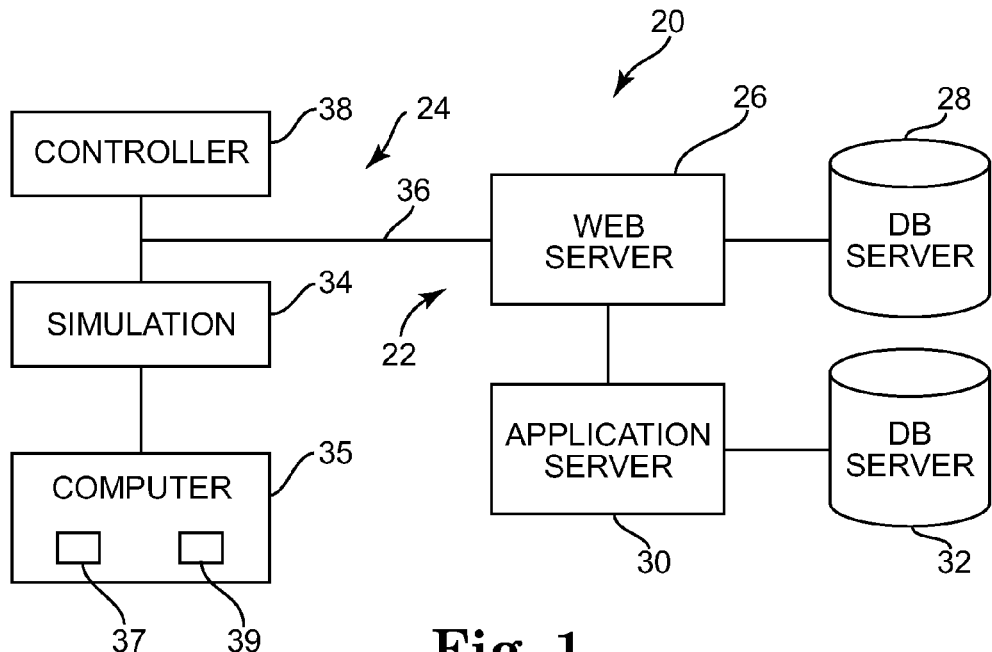
FIG. 1 is a schematic diagram illustrating an example environment of present disclosure.

FIG. 1 illustrates an example environment 20 for load testing constructed in accordance with the present disclosure. The environment 20 includes a server system 22 and a test system 24 that will put the server system 22 under a load test. The server system 22 can include components such as a web server 26 that can be connected to a database server 28 and an application server 30. The application server 30 can be connected to a second database server 32 on the server system. The test system 24 includes a simulation system 34 connected to the web server 26 via a communication line 36. The test system 24 also includes a controller 38 in communication with the simulation system 34 and the web server 26.

In the example, the simulation system 34 generates a multiplicity of virtual users that access the server system 22 and provide the load used to test all or part of the server system 22. In one example, the simulation system 34 can include a computer program running on a computing platform, such as a general purpose computer 35 having a processor 37 and a memory 39. The web server 26 can be accessed directly over the communication line 36, or the application server 30 and the database server 28 can be accessed indirectly through the web server 26. The second database server 32 can be accessed indirectly through the web server 26 and the application server 30. Any of the components of the server system 22, or features or parts of these components can be accessed and tested with the test system 24. The results of the test are provided to the controller 38, which can be configured to organize, manage, and record the test and test results. Of course, other examples and server system architectures are possible, and the example server system 22 is not intended to be limited to the particular architecture illustrated.

Figure 2:
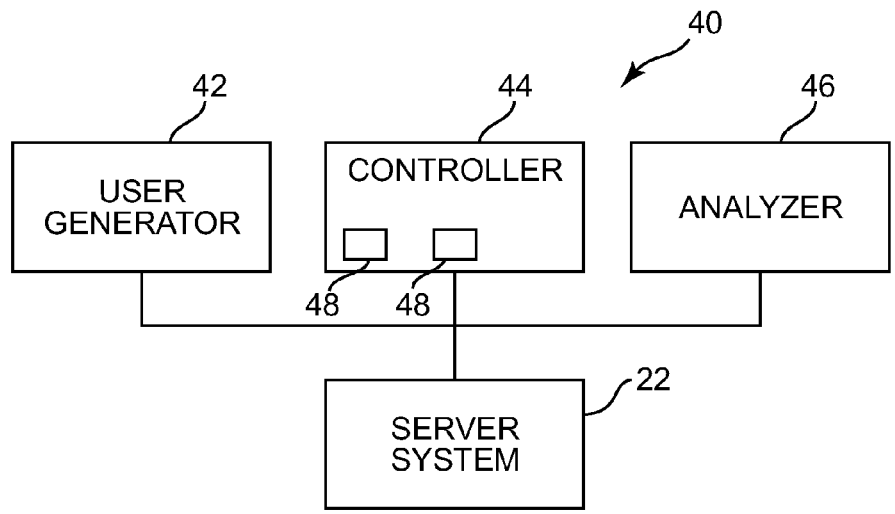
FIG. 2 is a block diagram illustrating another example test system included in the example environment of FIG. 1.

FIG. 2 illustrates another example of a test system 40 constructed in accordance with the present disclosure to test the server system 22. The system 40 includes a user generator 42, a controller 44, and an analyzer 46.

The user generator 40 provides for recording or scripting the test to be performed against the application under test. The user generator also enables playing back and making modifications to the script as needed. In one example, the simulation user generator can include a computer program running on the computing platform, such as the general purpose computer 35 having the processor 37 and memory 39.

The controller 44 runs the script prepared with the user generator 42. The controller 44 uses one or more load generator machines 48 configured with a controller agent to generate a load on the server system 22. These machines are also commonly known as injectors or load generators. Each test run is configured with a scenario that describes the scripts that will run, when the scripts will run, how many virtual users will run, and the load generators that will be used for each script. Each script in the scenario is connected to one or more load generator machines 48 that are going to act as a load generator and can include the number of virtual users to be run from a load generator.

Once a scenario is set and the run is completed, the result of the scenario can be viewed via the analyzer 46. The analyzer 46 takes the completed scenario result and prepares data that can be reviewed to indicate the condition of the server system 22 with respect to the scenario.

Figure 3:
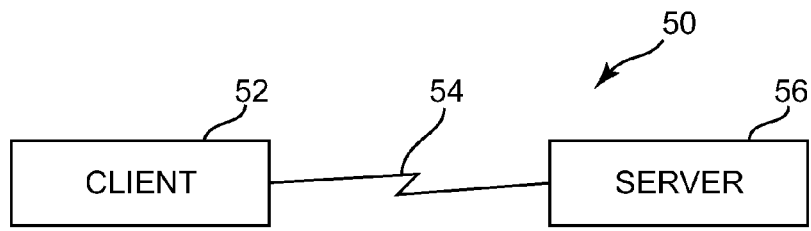
FIG. 3 is a block diagram illustrating a managed environment tested in the example environment of FIG. 1, with the example test system of FIG. 2, or both.

FIG. 3 illustrates an example of a managed environment 50 in a software framework to be tested in accordance with the present disclosure. Examples of software frameworks for implementing managed environments, as used here, include .NET from Microsoft Corp. or Java from Sun Microsystems, among others. The managed environment 50 includes a client/server model with a smart client 52 communicating 54 with a server 56, such as a particular web server 26, in the managed environment 50.

The smart client 52 is distinguishable from a thin client such as a browser or a fat client such as a desk-top application. The smart client 52 includes the look and feel of a desk-top application but also include the connectedness of a web-based program. Examples of common smart clients can include Outlook available from Microsoft and iTunes available from Apple, Inc.

An example of a particularly difficult system to load test includes a client application built in .NET that is communicating with a server using a communication tool such as a remoting application program interface. An example of the remoting application program interface is .NET Remoting, available from Microsoft. .NET Remoting is an example of an application program interface that provides an abstract approach to inter-process communication that separates the remotable object from a specific client or server application domain and from a specific mechanism of communication. The communication is typically binary or encrypted.

The test systems 24 and 40 are configured to test a selected application program interface of the managed environment client 52. In order to overcome the difficulties of testing in managed environments, the test system defines a filter for the managed environment of the application program interface. A filter for the managed environment 50 is a set of rules that define how to record the application program interface of the client 52. The filter includes a set of classes and methods of the software language of the framework, such as C# (c-sharp), java, or the like. The filter is used for load testing and is incorporated into the script. While recording the client application program interface, an event is logged and generated in the script for each instance the client 52 calls any of the methods or classes in the filter. When the script is played back, the same application program interfaces logged in the script are called again and generate the load on the server 56.

Two criteria can be used to define an efficient filter. First, the optimal number of classes is the least amount of classes used to accomplish the task of testing the application program interface. The number of classes recorded in the filter over the optimal number is related to the greater risk of capturing more code that will adversely affect the scalability of the replay. Second, each method in the filter references to a class of a constructor part of the application program interface. The script will not run otherwise.

Figure 4:
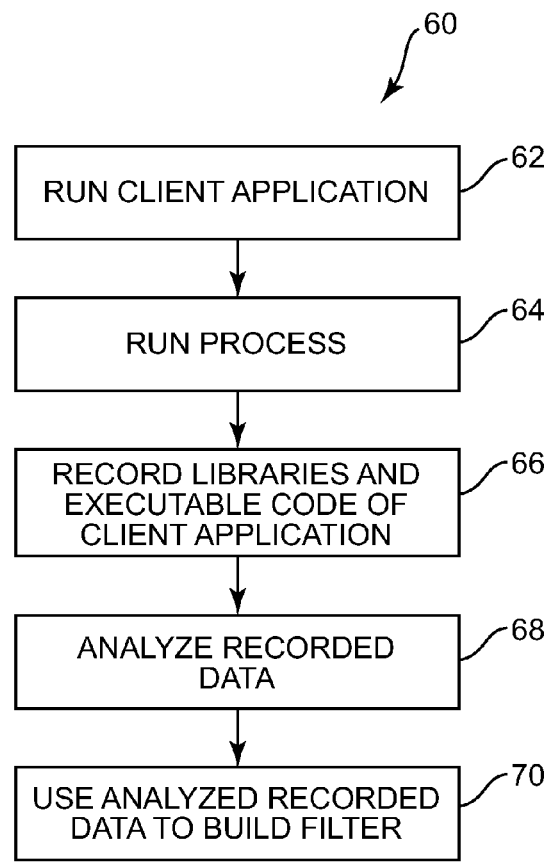
FIG. 4 is a flow diagram illustrating an example process for use with generating a test of the present disclosure for use on the managed environment of FIG. 3.

FIG. 4 illustrates a process 60 for automatically generating a filter configured for use in a script including the client side programming classes and methods for use in testing the managed environment 50. The client application 52 is launched and run at 62. The process is also launched and runs concurrently at 64 with the client application. The process records and logs all the managed libraries used in the client application and the flow of executable software code at 66. In one example, the process also records libraries that were loaded dynamically.

After recording is complete, the software code of the client application is analyzed to build a representation of the code at 68. In one example, the software code is subject to static code analysis where the code is analyzed without executing programs built from the software code. One example of a representation of the code can include a graph having nodes and arcs, where a node represents a class and an arc represents a method call. Node-arc topology is used to represent linear features and polygon boundaries and to support analysis functions. Nodes represent the beginning and ending vertices of each arc. Arcs that share a node are connected, and polygons are defined by a series of connected arcs. Node-arc topology also identifies terminator nodes of communication. The terminator nodes in the managed environment are known classes that generate client/server communication. One example of the known classes that generate client/server communication includes the socket classes in the .NET or the Java frameworks.

The representation of the code is used to build the filter at 70. The filter is constructed by including the terminator node, i.e., the classes that generate client server communication into a layer. The filer then includes the classes used to accomplish the task of testing the application program interface. The filter also includes the classes where constructor parts of the application program interface are referenced by the methods in filter. After the build is complete, the filter is ready for load testing in the managed environment protocols and can be included in generating the script.

Figure 5:
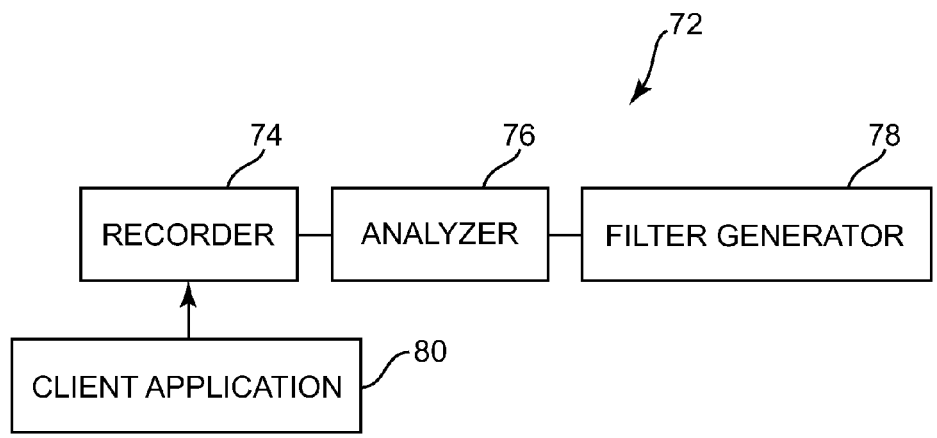
FIG. 5 is a block diagram illustrating an example system for use with a computing device to implement the process of FIG. 4.

FIG. 5 illustrates an example system 72 for implementation of the process 60 for automatically generating the filter in the script. The example system 72 can be implemented in the user generator 42 of the test system 40 and be run with a computing device 35 including the processor 37 and memory 38. The system 72 includes a recorder 74, a static analyzer 76, and a filter generator 78.

While a client application 80 is running, the recorder 74 is also executing in the background on the processor. The recorder 74 logs in the memory all the managed libraries used by the client application 80 and also the flow of code execution of the client application 80.

After the recording is complete, the static analyzer 76 retrieves the recorded data and analyzes the data, such as in an arc-node topology where nodes represent classes and arcs represent method call. Terminator nodes are also identified.

Once the software code of the client application 80 has been statically analyzed, the filter generator is used to build the filter with the processor based on the analysis. After the filter is built, it can be incorporated into the script.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A process for load testing a client/server managed environment having a server system and a client application, the process comprising:
    recording, into a computer memory, managed libraries used in the client application and a flow of executed instructions of the client application as a recorded data;
    analyzing, with a processor, a simulation of the client application built from the recorded data to identify classes in the client application that generate client/server communication and method calls;
    creating, with the processor, a filter to define recording of an application program interface of the simulation of the client application, the filter including the identified classes that generate client/server communication and methods that reference a class of a constructor part of the application program interface; and
    scripting a load test including incorporating the filter into a script, with a processor, to generate a load on the server system in the client/server managed environment.

2. The process of claim 1 wherein the managed libraries include all libraries that are loaded dynamically.

3. The process of claim 1 wherein the analyzing includes statically analyzing the executable instructions of the client application.

4. The process of claim 1 wherein the analyzing builds a representation of the executable instructions.

5. The process of claim 4 wherein the representation of the executable instructions includes a graph having nodes and arcs.

6. The process of claim 5 wherein the nodes represent a class within the executable instructions and the arcs represent method calls within the executable instructions.

7. The process of claim 6 wherein the nodes include terminator nodes which represent the classes that generate client/server communication.

8. The process of claim 1 wherein creating the filter includes identifying and including classes related to the client/server communication.

9. A computer-readable storage medium storing computer-executable instructions for controlling a computer system to load test a client/server environment including a server system and a client application, the computer-executable instructions arranged in a plurality of modules including:
    a recorder module including instructions configured to record managed libraries and executed instructions of the client application into a recorded data;
    an analyzer module including instructions configured to build a simulation of the client application from the recorded data to identify known classes in the client application of client/server communication and method calls in the executable instructions of the client application;
    a generator module including instructions configured to generate a filter to define recording of an application program interface of the simulation of the client application, the filter including the identified classes of client/server communication and methods that reference a class of a constructor part of the application program interface; and
    a simulator module to script a load test wherein the filter is incorporated into a script and apply a load on the server system in the client/server managed environment.

10. The computer-readable storage medium of claim 9 wherein the recorder module records managed libraries and executable instructions while the client application is executing.

11. The computer-readable storage medium of claim 9 wherein the client/server environment is in a managed environment.

12. The computer-readable storage medium of claim 11 wherein the client application is a smart client.

13. The computer-readable storage medium of claim 11 wherein client/server communication is at least one of encrypted or binary.

14. The computer-readable storage medium of claim 13 wherein the client server communication is a remoting application program interface.

15. The computer-readable storage medium of claim 11 wherein the instructions configured to generate a filter for an application layer include instructions to identify and include classes that generate client/server communication.

16. The computer-readable storage medium of claim 15 wherein the instructions configured to generate a filter for an application layer include instructions to identify and include classes related to the classes that generate client/server communication to complete the filter for the application layers.

17. A load testing system configured to test a client/server model in a managed environment having a client application and a server system, comprising:
    a testing processor coupled to a memory;
    a user generator operably coupled to the testing processor and the memory and configured to record managed libraries used in the client application and a flow of executed instructions of the client application as recorded data, analyze a simulation of the client application built from the recorded data to identify classes in the client application that generate client/server communication in the client/server model and method calls, creating a filter to define recording of an application program interface of the simulation of the client application, the filter including the identified classes that generate client/server communication and methods that reference a class of a constructor part of the application program interface, and scripting a load test including incorporating the filter into a script; and a controller configured to apply the script to generate a load test the server system in the client/server model in the managed environment.

18. The load testing system of claim 17 wherein the controller is configured to operate a plurality of virtual users to run the test.

19. The load testing system of claim 18 and including an analyzer to receive information regarding the client/server model under test.

20. The load testing system of claim 17 wherein the controller includes at least one load generating machine to provide a test load.

* * * * *